(12) United States Patent
Ii

(10) Patent No.: US 7,460,012 B2
(45) Date of Patent: Dec. 2, 2008

(54) METHOD AND SYSTEM FOR SYNCHRONIZING GEOGRAPHICALLY DISTRIBUTED RF SENSORS USING A PAIR OF RF TRIGGERING DEVICES

(75) Inventor: Mutsuya Ii, Shoreline, WA (US)

(73) Assignee: Agilent Technologies, Inc., Santa Clara, CA (US)

( * ) Notice: Subject to any disclaimer, the term of this patent is extended or adjusted under 35 U.S.C. 154(b) by 304 days.

(21) Appl. No.: 11/344,882

(22) Filed: Jan. 31, 2006

(65) Prior Publication Data

US 2007/0178842 A1    Aug. 2, 2007

(51) Int. Cl.
*H04Q 7/00* (2006.01)

(52) U.S. Cl. .................. 340/539.1; 340/539.2; 340/3.1; 340/3.5; 340/3.2; 368/47; 702/176; 702/177; 702/178

(58) Field of Classification Search ............... 340/539.1, 340/3.1, 825.2, 3.2, 3.24, 3.5, 825.21; 368/47; 368/53; 702/176, 79, 89, 177, 178, 179, 702/180

See application file for complete search history.

(56) References Cited

U.S. PATENT DOCUMENTS

| | | | | |
|---|---|---|---|---|
| 5,995,046 A * | 11/1999 | Belcher et al. | ............... | 342/450 |
| 6,201,499 B1 * | 3/2001 | Hawkes et al. | ............... | 342/387 |
| 6,208,247 B1 * | 3/2001 | Agre et al. | ............. | 340/539.19 |
| 6,295,019 B1 * | 9/2001 | Richards et al. | ............. | 342/125 |
| 6,512,478 B1 * | 1/2003 | Chien | .................... | 342/357.09 |

* cited by examiner

*Primary Examiner*—Jeff Hofsass
*Assistant Examiner*—Sisay Yacob

(57) ABSTRACT

RF sensors acquire and store RF data in memory. One RF sensor generates a trigger signal when the RF sensor detects a feature of interest in its acquired RF data. The detecting RF sensor wirelessly transmits the trigger signal to the non-detecting RF sensor. The non-detecting RF sensor reads the appropriate RF data from its memory in response to receipt of the trigger signal. The non-detecting RF sensor accesses the appropriate RF data using a time of day when the trigger signal is received and a predetermined time offset.

17 Claims, 5 Drawing Sheets

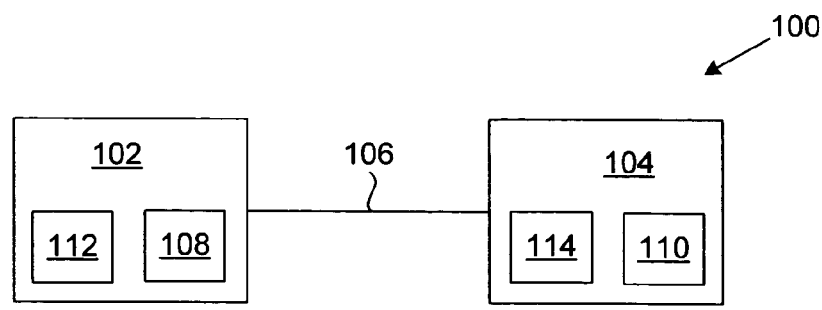
FIG. 1 – Prior Art
FIG. 2
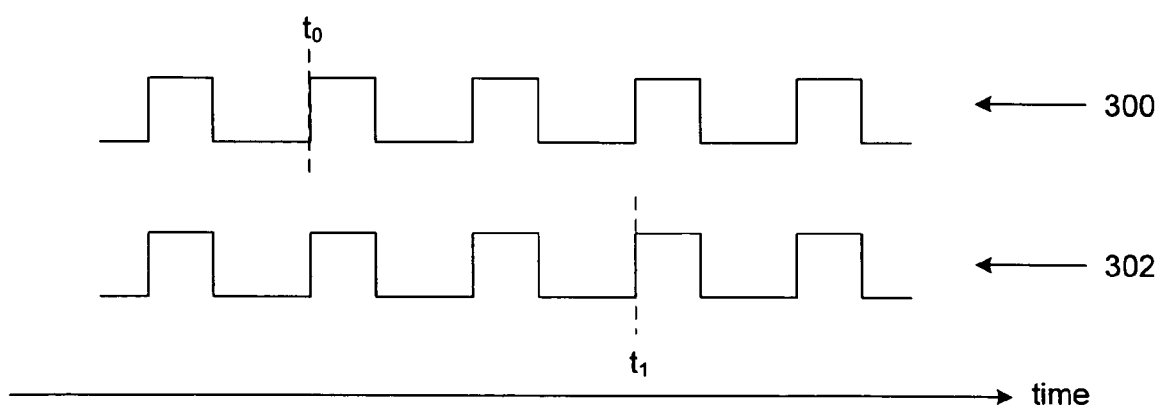
FIG. 3

METHOD AND SYSTEM FOR SYNCHRONIZING GEOGRAPHICALLY DISTRIBUTED RF SENSORS USING A PAIR OF RF TRIGGERING DEVICES

BACKGROUND

RF sensors that acquire and measure RF data are used in a variety of applications. A vector signal analyzer is one example of such an RF sensor. In some applications, networks of two or more RF sensors are used to acquire, timestamp, and buffer RF data. The RF sensors typically exchange timing information to synchronize each sensor to a common time. When one RF sensor in the network detects a feature of interest in its acquired RF data, the RF sensor generates and transmits a time-stamped message to the other RF sensors in the network. The time-stamp allows each RF sensor to read the RF data corresponding to the same period of time from its buffer.

FIG. 1 is a block diagram of a network of RF sensors in accordance with the prior art. Network 100 includes two RF sensors 102, 104 connected together via cable 106. When RF sensor 102 detects a feature of interest, controller 108 transmits a time-stamped message to RF sensor 10 using cable 106. The time-stamp allows RF sensor 104 to obtain the appropriate time-stamped RF data from buffer 110. Similarly, RF sensor 102 obtains the appropriate time-stamped RF data from buffer 112 when controller 114 transmits a time-stamped message to RF sensor 102.

Unfortunately, cable 106 limits the distance that can exist between RF sensor 102 and RF sensor 104. This limitation restricts the size of the geographical area a network of RF sensors can monitor. Thus, more than one network of RF sensors is typically needed to monitor large geographical areas, thereby increasing the costs of monitoring the large geographical areas.

SUMMARY

In accordance with the invention, a method and system for synchronizing geographically distributed RF sensors using a pair of RF triggering devices are provided. The RF sensors acquire and store RF data in memory. One RF sensor generates a trigger signal when the RF sensor detects a feature of interest in its acquired RF data. The detecting RF sensor wirelessly transmits the trigger signal to the non-detecting RF sensor. The non-detecting RF sensor reads the appropriate RF data from its memory in response to receipt of the trigger signal. The non-detecting RF sensor accesses the appropriate RF data using a time of day when the trigger signal is received and a predetermined time offset.

BRIEF DESCRIPTION OF THE DRAWINGS

FIG. 1 is a block diagram of a network of RF sensors in accordance with the prior art;

FIG. 2 is a conceptual diagram of a system for synchronizing geographically distributed RF sensors using a pair of RF triggering devices in an embodiment in accordance with the invention;

FIG. 3 is a timing diagram in an embodiment in accordance with the invention;

DETAILED DESCRIPTION

The following description is presented to enable embodiments in accordance with the invention to be made and used, and is provided in the context of a patent application and its requirements. Various modifications to the disclosed embodiments will be readily apparent, and the generic principles herein may be applied to other embodiments. Thus, the invention is not intended to be limited to the embodiments shown, but is to be accorded the widest scope consistent with the appended claims and with the principles and features described herein.

With reference to the figures and in particular with reference to FIG. 2, there is shown a conceptual diagram of a system for synchronizing geographically distributed RF sensors using a pair of RF triggering devices in an embodiment in accordance with the invention. Network 200 includes RF sensors 202, 204 both capable of transmitting and receiving trigger signals wirelessly. Embodiments in accordance with the invention are not limited to networks of two RF sensors. Embodiments in accordance with the invention can use any number of RF sensors. Because RF sensors 202, 204 transmit and receive signals wirelessly, RF sensors 202, 204 can be placed farther apart and monitor larger geographical areas.

FIG. 3 is a timing diagram in an embodiment in accordance with the invention. Time $t_0$ on waveform 300 represents a time of day when a detecting RF sensor detects a feature of interest in its acquired RF data and generates a trigger out signal. The trigger out signal is then transmitted to another RF sensor. Time $t_1$ on waveform 302 represents a time when the other RF sensor receives the trigger out signal and generates a trigger input signal. The time difference $(t_1-t_0)$ is a time offset that is calculated in embodiments in accordance with the invention. The time offset is used by the non-detecting RF sensor to read the appropriate RF data from memory. The time offset provides relative time of arrival information and allows for the exclusion of internal time-stamping circuitry from the RF sensors.

Figure 4:
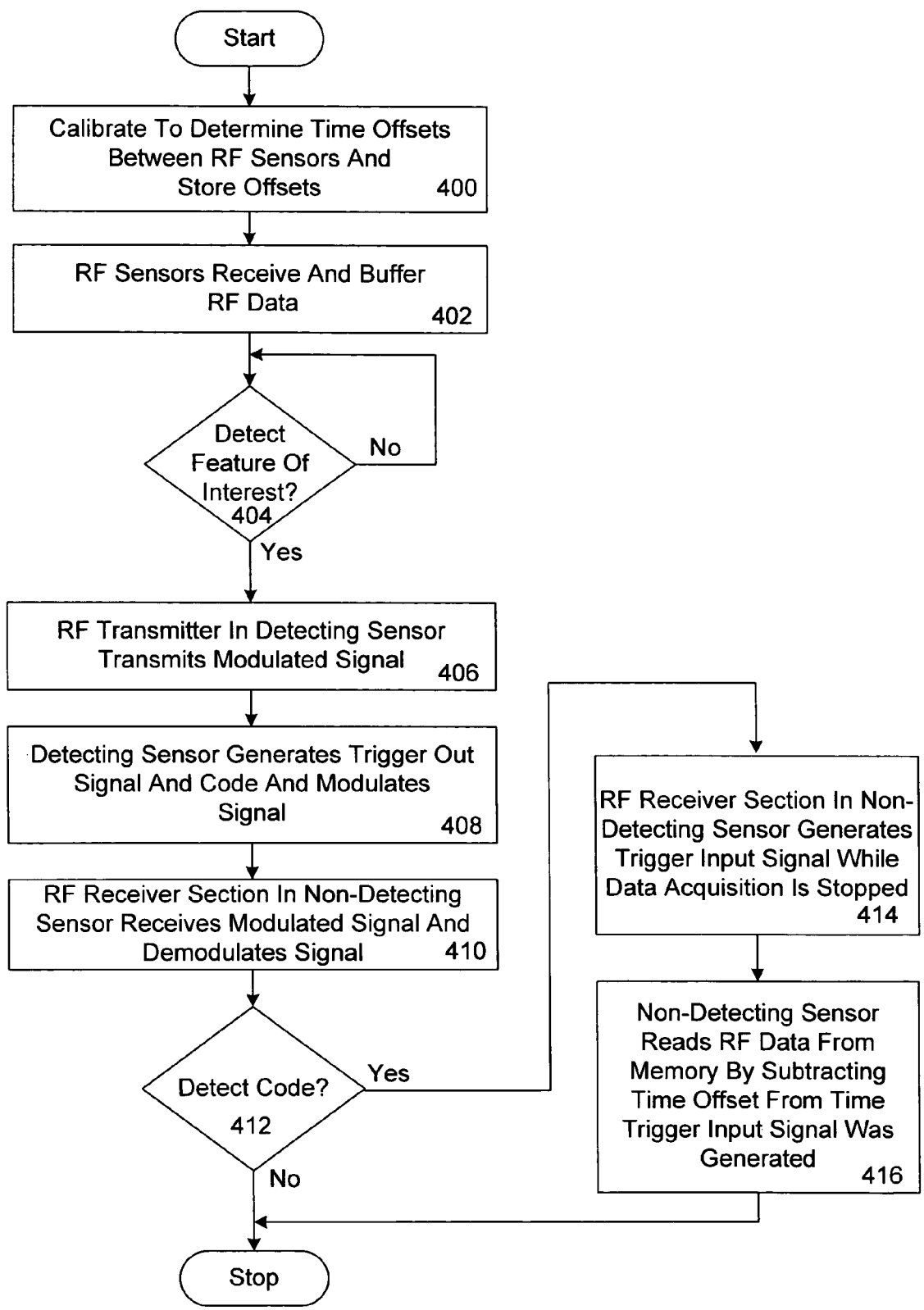
FIG. 4 is a flowchart of a method for synchronizing geographically distributed RF sensors using a pair of RF triggering devices in an embodiment in accordance with the invention.

Referring to FIG. 4, there is shown a flowchart of a method for synchronizing geographically distributed RF sensors using a pair of RF triggering devices in an embodiment in accordance with the invention. The method of FIG. 4 is described with reference to two RF sensors, but embodiments in accordance with the invention can use the method of FIG. 4 with three or more RF sensors.

Initially a calibration procedure is performed to determine the time offsets between the two RF sensors. One time offset is determined for a trigger signal transmitted from a first RF sensor to a second RF sensor. Another time offset is determined for a trigger signal transmitted from the second RF sensor to the first RF sensor. The time offsets are then stored in their respective RF sensors (block 400).

Next, at block 402, the RF sensors acquire and buffer RF data. A determination is then made at block 404 as to whether one of the RF sensors detects a feature of interest. The feature of interest is an RF signal in an embodiment in accordance with the invention. In another embodiment in accordance with the invention, the feature of interest is one or more characteristics of an RF signal.

When a feature of interest is detected, the process passes to block 406 where an instrument section in the detecting RF sensor generates a trigger out signal. The trigger out signal is received by an RF transmitter section in the detecting RF sensor. The RF transmitter section generates a code and then modulates the trigger out signal and code. Next, at block 408, the RF transmitter section wirelessly transmits the modulated trigger out signal and code to a non-detecting RF sensor.

An RF receiver section in the non-detecting RF sensor subsequently receives and de-modulates the modulated signal and code (block 410). A determination is then made at block 412 as to whether the RF receiver section detects the code. The code is included to provide for various sensor groupings and reduce the possibility of false trigger conditions in an embodiment in accordance with the invention.

When the RF receiver section detects the code, the RF receiver section in the non-detecting RF sensor generates a trigger input signal at block 414. Upon detection of a feature of interest (i.e. trigger event), whether the event is seen locally or by means of a RF trigger event communication received from another RF receiver in the network, data acquisition is stopped and preserved. The trigger input signal is received by an instrument section in the non-detecting RF sensor, which causes the instrument section in the non-detecting RF sensor to read the appropriate RF data from memory (block 416). The appropriate RF data corresponds to the time period when the trigger out signal is generated by the instrument section in the detecting RF sensor in an embodiment in accordance with the invention. The instrument section in the non-detecting RF sensor is able to read the appropriate RF data from memory by subtracting its respective time offset determined at block 400 from the time the trigger input signal was generated and the data preserved.

Figure 5:
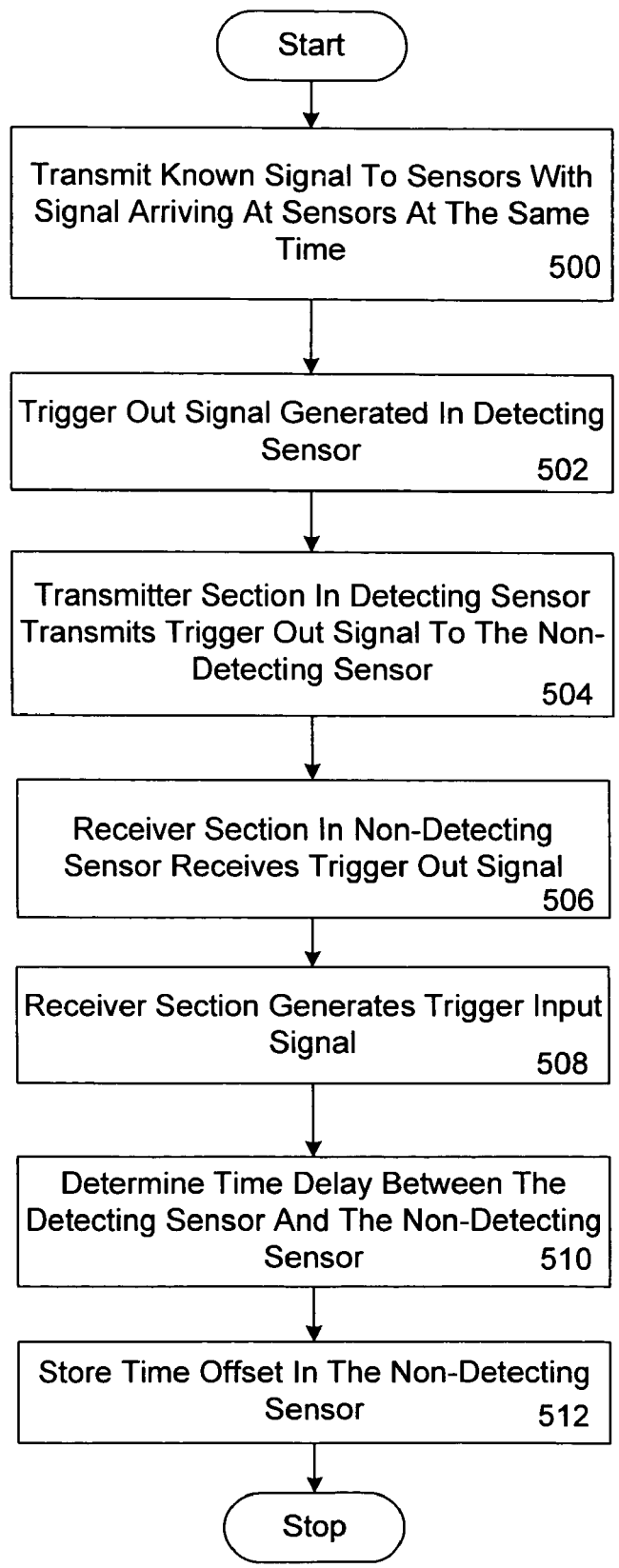
FIG. 5 is a flowchart of a first calibration method to determine the time offsets between RF sensors that may be used in block 400 of FIG. 4.

FIG. 5 is a flowchart of a first calibration method to determine the time offsets between RF sensors that may be used in block 400 of FIG. 4. The method shown in FIG. 5 determines a time offset for a trigger signal transmitted from one RF sensor to a second RF sensor (in one direction). Embodiments in accordance with the invention would perform the method twice in order to also determine the time offset for a trigger signal transmitted from the second RF sensor to the one RF sensor (in the reverse direction).

Initially a known signal is simultaneously transmitted to both RF sensors. The RF emitter is positioned such that the known signal arrives at the RF sensors at the same time (block 500). This allows the arrival time at both RF sensors to be known.

Next, at block 502, an RF sensor detects the known RF signal and the instrument section in the detecting RF sensor generates a trigger out signal. The RF transmitter section then transmits the trigger out signal to the other RF sensor (block 504). The RF receiver section in the non-detecting RF sensor subsequently receives the trigger out signal (block 506) and generates a trigger input signal (block 508). The trigger input signal is transmitted to the instrument section in the non-detecting RF sensor. The time offset between the generation of the trigger out signal and the generation of the trigger input signal is then determined, as shown in block 510. The time offset is calculated by subtracting the arrival time of the known signal at the triggering RF sensor from the time the trigger input signal was generated by the non-detecting sensor. This calculation compensates for the amount of time between the generation of the trigger out signal by the detecting sensor and the generation of the trigger input signal by the non-detecting sensor. Partial sample-delay technology, as known as "pulse-stretching" technology, can be used to determine the delay with sub-nanosecond accuracy. Finally, at block 512, the time offset is stored in memory in the non-detecting RF sensor.

Figure 6:
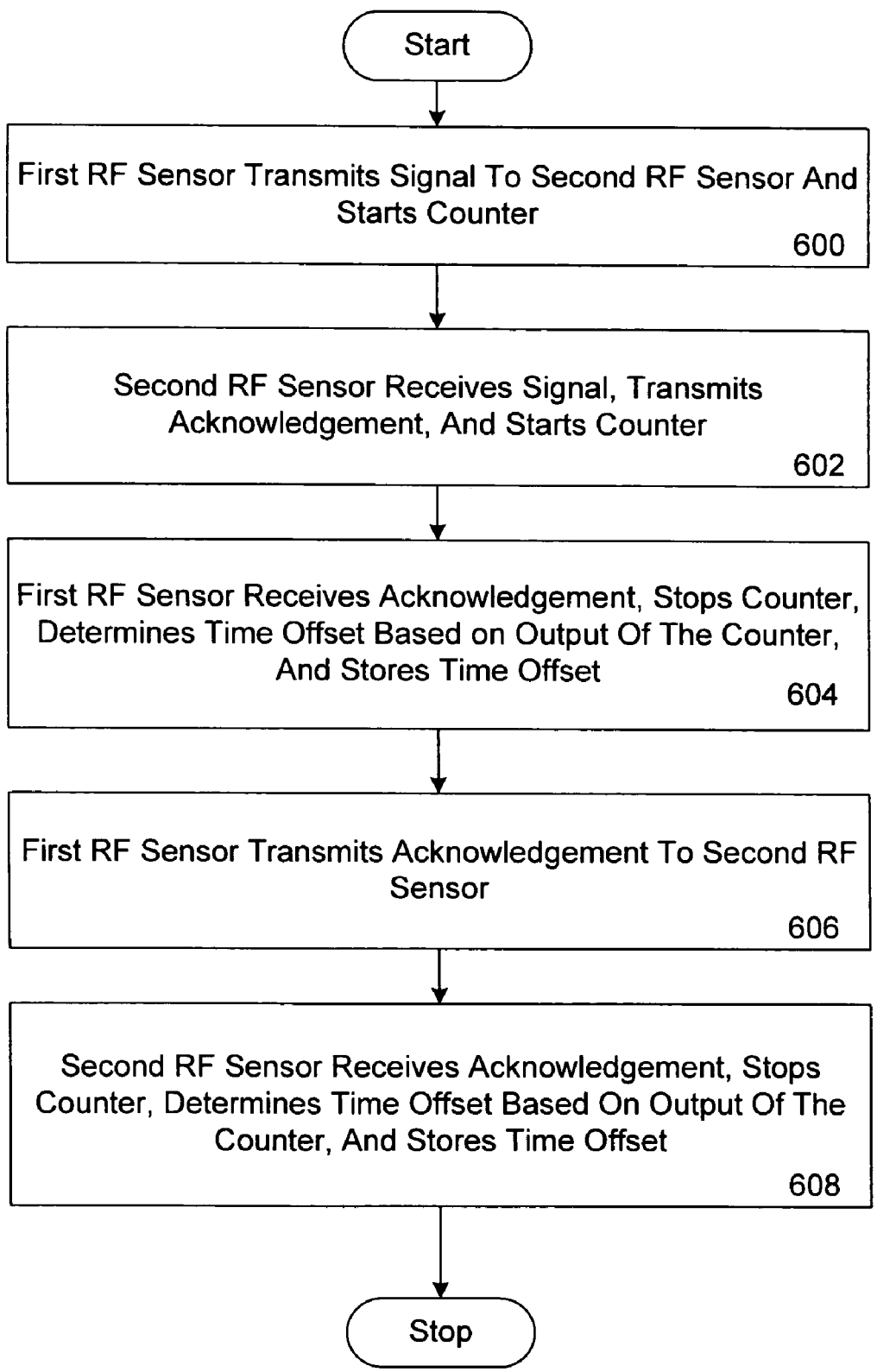
FIG. 6 is a flowchart of a second calibration method to determine the time offsets between RF sensors that may be used in block 400 of FIG. 4.

Referring to FIG. 6, there is shown a flowchart of a second calibration method to determine the time offsets between RF sensors that may be used in block 400 of FIG. 4. Initially a first RF sensor transmits a signal to a second RF sensor and starts a counter, as shown in block 600. When the second RF sensor receives the signal, the second RF sensor transmits an acknowledgment to the first RF sensor and starts a counter (block 602). When the first RF sensor receives the acknowledgment, the first RF sensor stops its counter and determines the round trip propagation delay between itself and the second RF sensor based on the output of the counter (block 604).

The first RF sensor then transmits an acknowledgement to the second RF sensor, as shown in block 606. When the second RF sensor receives the acknowledgment, the second RF sensor stops its counter and determines a round trip propagation delay between itself and the first RF sensor based on the output of the counter (block 608). Thus, the round trip propagation delays are obtained for both RF sensors.

Having the round trip propagation delays for both RF sensors allows averaging and self diagnosis in the event the propagation delays are dissimilar. When the round trip propagation delays are similar, each round trip time can be divided by two to provide an estimate of the time offset for each RF sensor. Again, the known technique of partial sample-delay technology can be used to measure the round trip times to sub-nanosecond accuracy. The calibration methods shown in FIGS. 5 and 6 are repeated whenever the locations of RF sensors change in an embodiment in accordance with the invention. In other embodiments in accordance with the invention, the calibration methods shown in FIGS. 5 and 6 are performed periodically regardless of any change in location of either RF sensor.

Figure 7:
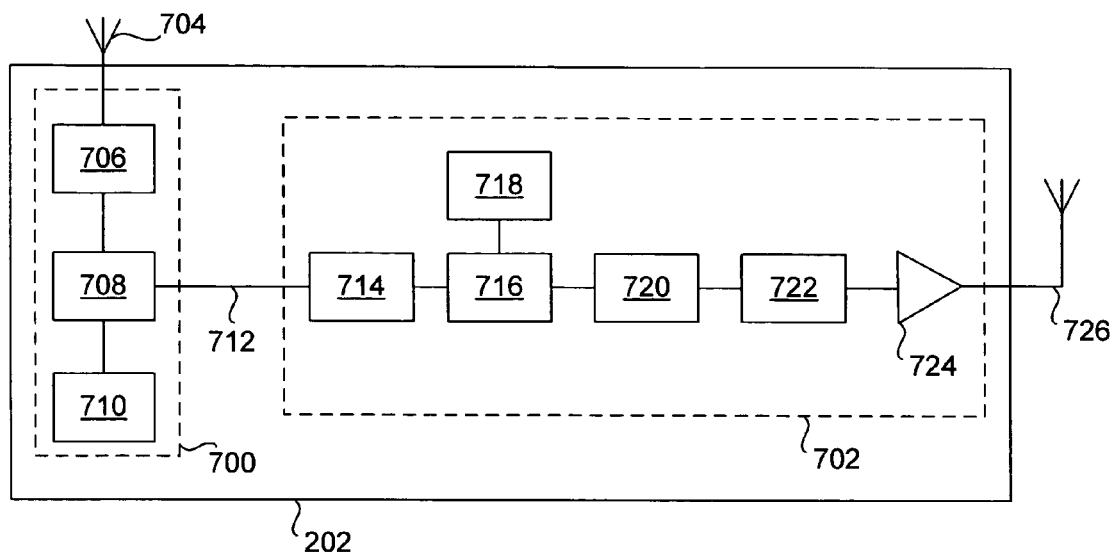
FIG. 7 is a block diagram of a detecting RF sensor in an embodiment in accordance with the invention.

FIG. 7 is a block diagram of a detecting RF sensor in an embodiment in accordance with the invention. Only those blocks needed to describe the invention are shown in FIG. 7. RF sensor 202 includes instrument section 700 and RF transmitter section 702. Instrument section 700 includes antenna 704, buffer 706, processor 708, and clock 710. Clock 710 is implemented as a global positioning system in an embodiment in accordance with the invention.

In another embodiment in accordance with the invention, a time record of when the trigger event occurred locally at one RF sensor relative to the same event occurring at the other RF sensors is used instead of clock 710. The time record can be obtained to a resolution of a sample or to an even finer resolution by employing partial sample-delay technology. The time offset or trigger signal propagation delay is determined through known mathematical techniques, thereby resulting in three or more complex (I and Q) time records which are aligned in time with respect to one another. The position of the feature of interest can then be determined through correlation methods to determine the Time Difference of Arrival (TDOA) at each sensor.

RF data is acquired by instrument section 700 using antenna 704. Buffer 706 stores the acquired RF data. The RF data includes the I and Q data points in an embodiment in accordance with the invention. Processor 708 then analyzes the acquired RF data to detect a feature of interest. When a feature of interest is detected in the RF data, processor 708 transmits a trigger out signal to RF transmitter section 702 via line 712.

The trigger out signal is input into comparator 714, which then inputs the signal into modulator 716. Modulator 716 receives a code from code sequencer 718 and modulates the signal and code. The modulated signal and code are then input into up converter 720, which converts the modulated signal and code into a frequency that is used to send the RF signal.

The converted modulated signal and code are then input into filter 722 and amplifier 724, which narrows the frequency prior to transmission and amplifies the signal, respectively. And finally, the trigger out signal and code are transmitted using antenna 726.

Figure 8:
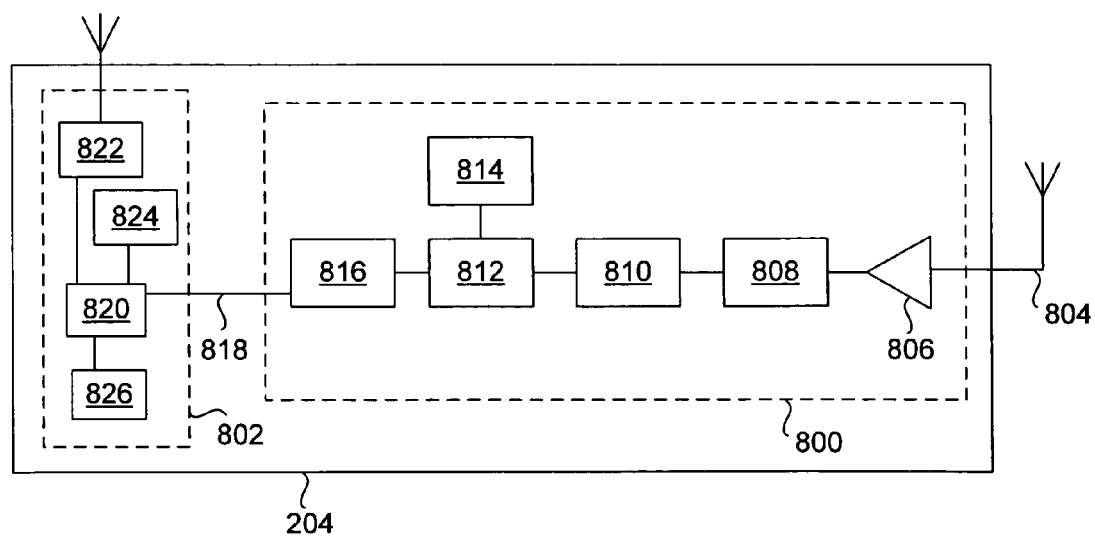
FIG. 8 is a block diagram of a non-detecting RF sensor in an embodiment in accordance with the invention.

FIG. 8 is a block diagram of a non-detecting RF sensor in an embodiment in accordance with the invention. Non-detecting RF sensor 204 includes RF receiver section 800 and instrument section 802. Only those blocks needed to describe the invention are shown in FIG. 8. RF receiver section 800 includes antenna 804, amplifier 806, filter 808, down converter 810, demodulator 812, code sequencer 814, and edge generator 816.

The modulated trigger out signal and code are received by antenna 804 and input into amplifier 806. Filter 808 expands the frequency while down converter 810 converts the frequency to a particular frequency spectrum that can be processed. Demodulator 812 de-modulates the trigger out signal and code and code sequencer 814 determines if the transmitted code matches the code in code sequencer. And finally, edge generator 816 generates a trigger input signal when the two codes match.

The trigger input signal is transmitted to instrument section 802 via line 818. Processor 820 receives the trigger input signal and reads the appropriate RF data from buffer 822. Processor 820 accesses the appropriate RF data from buffer 822 using a time offset stored in memory 824 and clock 826 in an embodiment in accordance with the invention. Clock 826 is implemented as a global positioning system in an embodiment in accordance with the invention.

Processor 820 determines the time trigger input signal is received using clock 826 and then subtracts the time offset from the time. This calculation results in the time when the detecting RF sensor detected the feature of interest and generated the trigger out signal. Processor 820 then reads the RF data from buffer 822 that corresponds to the time the trigger out signal was generated by a detecting RF sensor.

The invention claimed is:

1. A method for synchronizing first and second geographically distributed RF sensors, the method comprising:
    operating the first and second sensors to acquire and store RF data from a source external to said first and second sensors;
    operating the first sensor to generate a trigger signal in response to detecting a feature of interest in the RF data acquired by the first sensor;
    operating the first sensor to wirelessly transmit the trigger signal;
    operating the second sensor to wirelessly receive the trigger signal; and
    operating the second sensor to read stored RF data based on a time offset associated with a time difference between the first sensor generating the trigger signal and the second sensor receiving the trigger signal;
    wherein said stored RF data is stored for a period of time longer than said time offset.

2. The method of claim 1, further comprising:
    modulating the trigger signal prior to wireless transmission; and
    de-modulating the trigger signal prior to reading stored RF data.

3. The method of claim 1, wherein
    generating a trigger signal comprises generating a trigger out signal;
    wirelessly transmitting the trigger signal comprises wirelessly transmitting the trigger out signal; and
    wirelessly receiving the trigger signal comprises wirelessly receiving the trigger out signal.

4. The method of claim 3, further comprising operating the second sensor to generate a trigger input signal in response to wirelessly receiving the trigger out signal.

5. The method of claim 4, further comprising operating the first sensor to receive the trigger input signal.

6. The method of claim 5, wherein reading stored RF data based on a time offset associated with a time difference between the first sensor generating the trigger signal and the second sensor receiving the trigger signal comprises reading stored RF data based on a time offset associated with a time difference between the first sensor generating the trigger out signal and the second sensor receiving the trigger input signal.

7. The method of claim 1, further comprising:
    including a first code with the trigger signal prior to the first sensor wirelessly transmitting the trigger signal; and
    determining whether the first code matches a second code after the second sensor wirelessly receives the trigger signal and first code.

8. The method of claim 1, further comprising determining the time offset prior to acquiring the RF data.

9. An RF sensor, comprising: an RF receiver section operable to receive a trigger signal form another of said RF sensors; a clock; and an instrument section comprising a first memory operable to store acquired RF data and a processor operable to read RF data from the first memory using a time offset determined by the trigger signal and a time of day generated by the clock, wherein the stored RF data is stored in the first memory for period of time longer than the time offset.

10. The RF sensor of claim 9, further comprising an RF transmitter section.

11. The RF sensor of claim 9, further comprising an antenna operable to receive RF data.

12. The RF sensor of claim 9, wherein the predetermined time offset is stored in a second memory.

13. A system, comprising: a first RF sensor operable to detect a feature of interest in acquired RF data and responsively generate and wirelessly transmit a trigger signal; and a second RF sensor operable to wirelessly receive the trigger signal and responsively read RF data from a memory using a time offset determined by the trigger signal and a time of day generated by a clock, wherein the stored RF data is stored in the first memory for period of time longer than the time offset.

14. The system of claim 13, wherein the first RF sensor comprises:
    an instrument section operable to detect the feature of interest and responsively generate the trigger signal; and
    an RF transmitter section operable to wirelessly transmit the trigger signal.

15. The system of claim 14, wherein the second RF sensor comprises:
    an RF receiver section operable to wirelessly receive the trigger signal; and
    an instrument section operable to read RF data from the memory using a predetermined time offset and a time of day generated by the clock.

16. The system of claim 15, wherein the RF transmitter section in the first RF sensor is also operable to generate a first code and wirelessly transmit the first code with the trigger signal.

17. The system of claim 16, wherein the RF receiver section in the second RF sensor is also operable to generate a second code and determine whether the first code matches the second code.

* * * * *